United States Patent [19]

Choi et al.

[11] 4,211,859

[45] Jul. 8, 1980

[54] ANTISTATIC AGENTS, SYNTHESIS AND USE THEREOF

[76] Inventors: Sam K. Choi, CPO Box 150 Chung Ryang Ni; Kee D. Lee, CPO Box 1780, both of Seoul, Rep. of Korea

[21] Appl. No.: 957,213

[22] Filed: Nov. 2, 1978

[30] Foreign Application Priority Data

Nov. 16, 1977 [KR] Rep. of Korea .................. 77-2682

[51] Int. Cl.² ............................................. C08G 63/20
[52] U.S. Cl. .................................. 528/275; 260/429.9; 528/272; 528/281; 528/300; 560/1; 525/437
[58] Field of Search ............... 528/272, 273, 300, 275, 528/281; 260/429.9; 560/1

[56] References Cited

U.S. PATENT DOCUMENTS

| | | |
|---|---|---|
| 3,288,175 | 11/1966 | Valko . |
| 3,582,448 | 6/1971 | Okuhashi et al. . |
| 3,702,350 | 11/1972 | Kimura et al. .................. 260/835 |
| 3,755,497 | 4/1973 | Weedon et al. .................. 260/860 |
| 3,962,185 | 6/1976 | Chimura et al. .................. 528/273 |

*Primary Examiner*—Lucille M. Phynes
*Attorney, Agent, or Firm*—C. Leon Kim; Roland A. Dexter

[57] ABSTRACT

Polyester fibers having excellent antistatic properties are produced by incorporating therein a novel antistatic agent synthesized by partially esterifying a dimetallic salt with a polyalkylene glycol.

3 Claims, No Drawings

ANTISTATIC AGENTS, SYNTHESIS AND USE THEREOF

BACKGROUND OF THE INVENTION

1. Field of the Invention

The present invention relates to novel antistatic agents useful for the production of polyester fibers having excellent antistaticity without compromising their desirable fiber characteristics. More particularly, it pertains to new dimetallic salts having one of their terminal groups capped by a polyalkylene oxide group, which are useful in ameliorating the electrostaticity of various polyester fibers.

2. Description of the Prior Art

Polyester fibers, although being widely used for such purposes as making clothes, curtains, tents and the like due to their good flexibility, mechanical strength and insulation ability, suffer from their notorious electrostaticity. Accordingly, numerous attempts have been made to cure the defect. For example, U.S. Pat. No. 3,582,448 offers a method of providing a garment comprising an outside fabric and a lining containing an electrically conductive fiber, which electrically conductive fiber in turn consists of a substrate of chemical fiber and an electrically conductive coating thereon. This method may not only be cumbersome to practice but also produce a limited effect depending on the durability of the coating employed. Furthermore, such garment has a built-in limitation on its applications. As another method of overcoming the electrostatic problem, U.S. Pat. No. 3,288,175 discloses the incorporation of a small quantity of metallic fiber into synthetic fibers. However, due to the incompatibility between the two types of fibers, various difficulties may be encountered in such steps as mixing the two types of fibers, spinning, weaving, processing, dyeing, finishing and the like.

SUMMARY OF THE INVENTION

In accordance with the present invention, however, polyester fibers having excellent antistatic properties can be manufactured without incurring the difficulties mentioned above or otherwise sacrificing their desirable characteristics. Such antistatic polyester fibers are produced by incorporating therein a novel antistatic agent which may be represented as follows:

$$X-\overset{O}{\underset{\|}{C}}-R-\overset{O}{\underset{\|}{C}}-X^1-M-X^1-\overset{O}{\underset{\|}{C}}-R-\overset{O}{\underset{\|}{C}}-O-R_1 \quad \text{(Eq. 1)}$$

wherein $X, R, X^1, M$, and $R_1$ have the meanings described below.

1. X is selected from the group consisting of:
   (a) HO—;
   (b) $NH_2$—;
   (c) $OHSO_3$—; and
   (d) Cl—, Br—, or I—.

2. $X^1$'s, which can be either identical or different, are selected from the group consisting of:
   (a) —O—;
   (b) —NH—; and
   (c) —$SO_3$—.

3. R's, which can either be identical or different, are selected from the group consisting of:
   (a) —$(CH_2)_n$— wherein n is an integer ranging from 1 to 8, preferably from 1 to 6 and more preferably from 1 to 4;
   (b) —$(HC=CH)_k$—
   wherein k is either 1 or 2;
   (c) —$(C\equiv C)$—;
   (d) 

and
   (e) 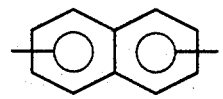

4. $R_1$ is the radical of a polyalkylene glycol, which radical may be represented as $$-[(CH_2)_m-O]_p-(CH_2)_m-OH$$

wherein p is a number ranging from about 10 to about 1,500 preferably from about 20 to about 1,000 and more preferably from about 30 to about 150; and, m is either 2 or 3.

5. M is a divalent metal selected from the group consisting of Be, Mg, Ca, Sr, Ba, Zn and Cd, and more preferably Mg, Ca, Ba and Zn.

The antistatic agent of Equation 1 may preferably be synthesized in two steps. At the first step, two moles of same or different acyl compounds, e.g., dicarboxylic acids, are reacted with one mole of a dimetallic compound as illustrated below:

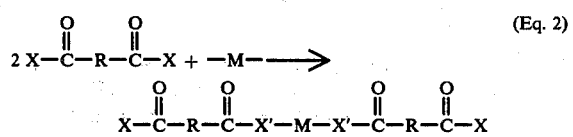

(Eq. 2)

wherein, in the case of a dicarboxylic acid, X is —OH and X' is —O—

The condensation reaction of Equation 2 may be carried out at a temperature ranging from about 30° C. to about 300° C. preferably from about 30° C. to about 200° C. and more preferably from about 30° C. to about 150° C. and at an atmospheric pressure.

At the second step, the salt produced in the condensation reaction of Equation 2 is then partially esterified with equal moles of a polyalkylene glycol so as to cap one of the functionally active terminal groups, i.e., X, of the salt as follows:

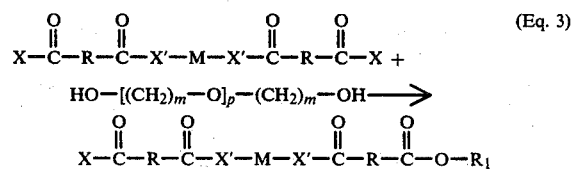

(Eq. 3)

wherein $R_1$ is $-[(CH_2)_m-O]_p-(CH_2)_m-OH$.

This esterification reaction may be conducted at conventional esterification conditions, e.g., temperatures ranging from about 60° C. to about 300° C. and at a reduced pressure, e.g., near vacuum, and by employing such catalysts as calcium acetate, zinc acetate, MnO, Mn(OAc)$_2$, LiH, LiOAc, NaOH, KOH, paratoluene sulfonic acid and the like.

Alternatively, the antistatic agent of Equation 1 may be synthesized in one step, i.e., by simultaneously carrying out the two Equation 2(condensation) and Equation 3(esterification) steps.

The antistatic agent of Equation 1 or 3 above may then be directly incorporated in any commercially available polyester in a weight ratio (antistatic agent/polyester) ranging from about 0.001 to about 4, preferably from about 0.01 to about 0.25 and more preferably from about 0.02 to about 0.1.

Preferably, however, the antistatic agent may be more effectively utilized by first synthesizing a master chip polyester, containing the antistatic agent of the present invention, which is then pulverized and mixed together with a common polyester before spinning.

For the sake of illustration, the preparation of a common polyester may be described as follows:

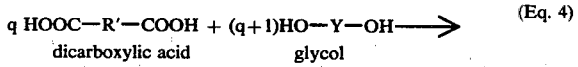 (Eq. 4)

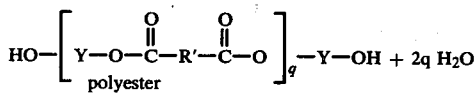

wherein R' and Y are appropriate hydrocarbons to form a dicarboxylic acid and a glycol respectively. The polyester of Equation 4 is then reacted with the antistatic agent to form the so-called master chip ester, e.g., as follows:

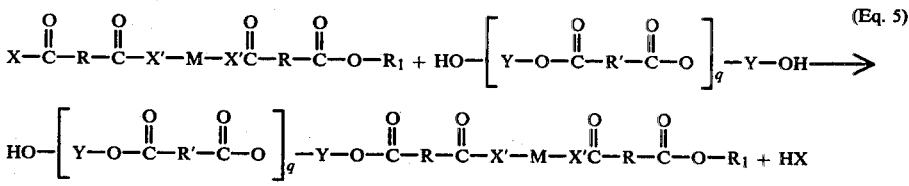

The master chip polyester produced in Equation 5 may then be pulverized, washed with boiling water and then mixed with a common polyester in a weight ratio (mater chip/common polyester) ranging from about 0.005 to about 20, preferably from about 0.05 to about 1.25 and more preferably from about 0.1 to about 0.5; and then be spun to produce an antistatic polyester fiber.

The following examples will further serve to illustrate the preparation and use of the novel antistatic agents. However, no limitations are to be implied from these examples.

EXAMPLE 1

This example is intended to illustrate the preparation of the antistatic agent represented in Equation 1 or 3.

About 174 grams of suberic acid and about 36 grams of zinc oxide were placed in a 500 ml three-necked flask containing about 300 ml of aceton. The reaction mixture was heated at about 30° C. for about 30 minutes, which produced about 228 grams (96% theoretical yield) of a solid product. This solid product was washed several times with acetone and dried in a vacuum oven at room temperature for overnight. I.R. analysis of the product verified it to be

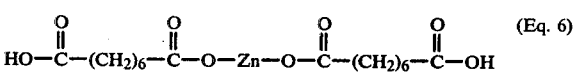 (Eq. 6)

About 50 grams of the product of Equation 6 was then reacted with about 500 grams of polyethylene glycol having the molecular weight of about 4,000 at about 150° C. for about 3 hours under an atmospheric pressure in the presence of calcium acetate as catalyst.

I.R. analysis of the ester verified it to be;

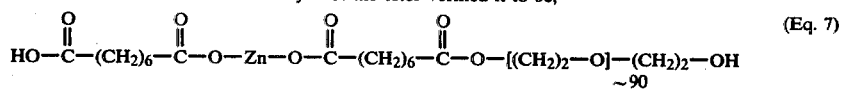 (Eq. 7)

EXAMPLE 2

This example is intended to illustrate the preparation of the master chip described in Equation 5.

The mixture of about 970 parts of dimethyl terephthalate, about 650 parts of ethylene glycol and one part of zinc acetate and antimony oxide was placed in a three-necked flask equipped with a mechanical stirrer and a thermometer.

The reaction mixture was heated at 200° C. under an atmospheric pressure for about 2 hrs and then at 270° C. for about 1 hr. When the polyester of the molecular weight of approximately 1,700 was obtained, 60 parts of the antistatic agent of Equation 7 prepared in Example 1 was added into the reaction system; and, upon reacting for one hour, the resulting product, which is called the master chip polyester, was removed from the flask.

The master chip was then pulverized and washed with boiling water for about 3 hrs and dried. I.R. analysis of the master chip ester verified it to be:

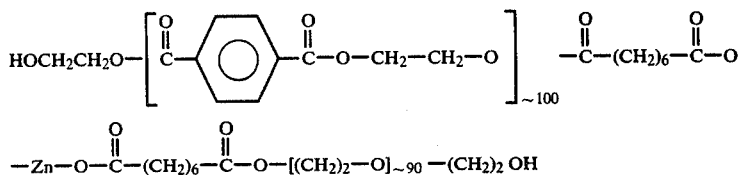

EXAMPLE 3

This example is intended to show the preparation of an improved antistatic polyester fiber by way of combining a common polyester fiber and the master chip ester prepared in Example 2.

About 88 wt. % of a common polyester known as PET and about 12 wt. % of the master chip ester prepared in Example 2 were blended together at about 280° C. for about 2 hours under a vacuum condition and spun to produce an antistatic fiber.

The antistatic properties of the antistatic polyester fiber and the common fiber were measured and reproduced in Table 1 below.

TABLE 1*

|  | Antistatic Fiber | Common Polyester Fiber |
| --- | --- | --- |
| Static charge (V) | 620 | 3,200 |
| Resistivity (Ω-cm) | 2.05 × 10$^9$ | 3 × 10$^{16}$ |
| Charge half-life (sec) | 3.8 | ∞ |
| Static Charge after 10 washings | 900 | Above 3,200 |
| Resistivity after 10 washings (Ω-cm) | 4.5 × 10$^9$ | 10$^{16}$ |
| Static Charge after 50 washings (V) | 1,250 | 3,200 |
| Resistivity after 50 washings (Ω-cm) | 1.8 × 10$^{10}$ | 10$^{16}$ |

*Measurements were taken at 22° C. and 60% RH

What is claimed is:

1. An antistatic agent useful for the manufacture of an antistatic polyester fiber having the structural formula of:

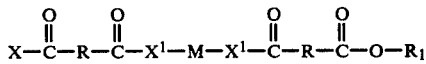

wherein
(1) X is selected from the group consisting of
  (a) HO—,
  (b) $NH_2$—,
  (c) $OHSO_3$—, and
  (d) Cl—, Br—, or I—;
(2) $X^1$'s, which can be either identical or different, are selected from the group consisting of
  (a) —O—,
  (b) —NH—, and
  (c) —$SO_3$—;
(3) R's, which can be either identical or different, are selected from the group consisting of
  (a) —$(CH_2)_n$— where n is an integer ranging from 1 to 8,
  (b) —(HC=CH)$_k$— wherein k is either 1 or 2,
  (c) —(C≡C)—,
  (d) 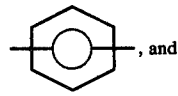, and
  (e) ;

(4) $R_1$ is a polyalkylene glycol radical having the structural representation of $$—[(CH_2)_m—O]_p—(CH_2)_m—OH$$

where p is a number ranging from about 10 to about 1,500 and m is either 2 or 3; and (5) M is a divalent metal selected from the group consisting of Be, Mg, Ca, Sr, Ba, Zn and Cd.

2. The antistatic agent of claim 1 wherein said R is —$(CH_2)_n$— and n is an integer ranging from 1 to 4.

3. The antistatic agent of claim 1 wherein said M is divalent metal selected from the group consisting of Mg, Ca, Ba and Zn.

* * * * *